July 11, 1972 S. E. SPEED 3,676,071
PROCESS FOR CONTROLLED PRODUCTION OF HYDROGEN GAS BY THE CATALYZED AND CONTROLLED DECOMPOSITION OF ZIRCONIUM HYDRIDE AND TITANIUM HYDRIDE
Filed April 22, 1970
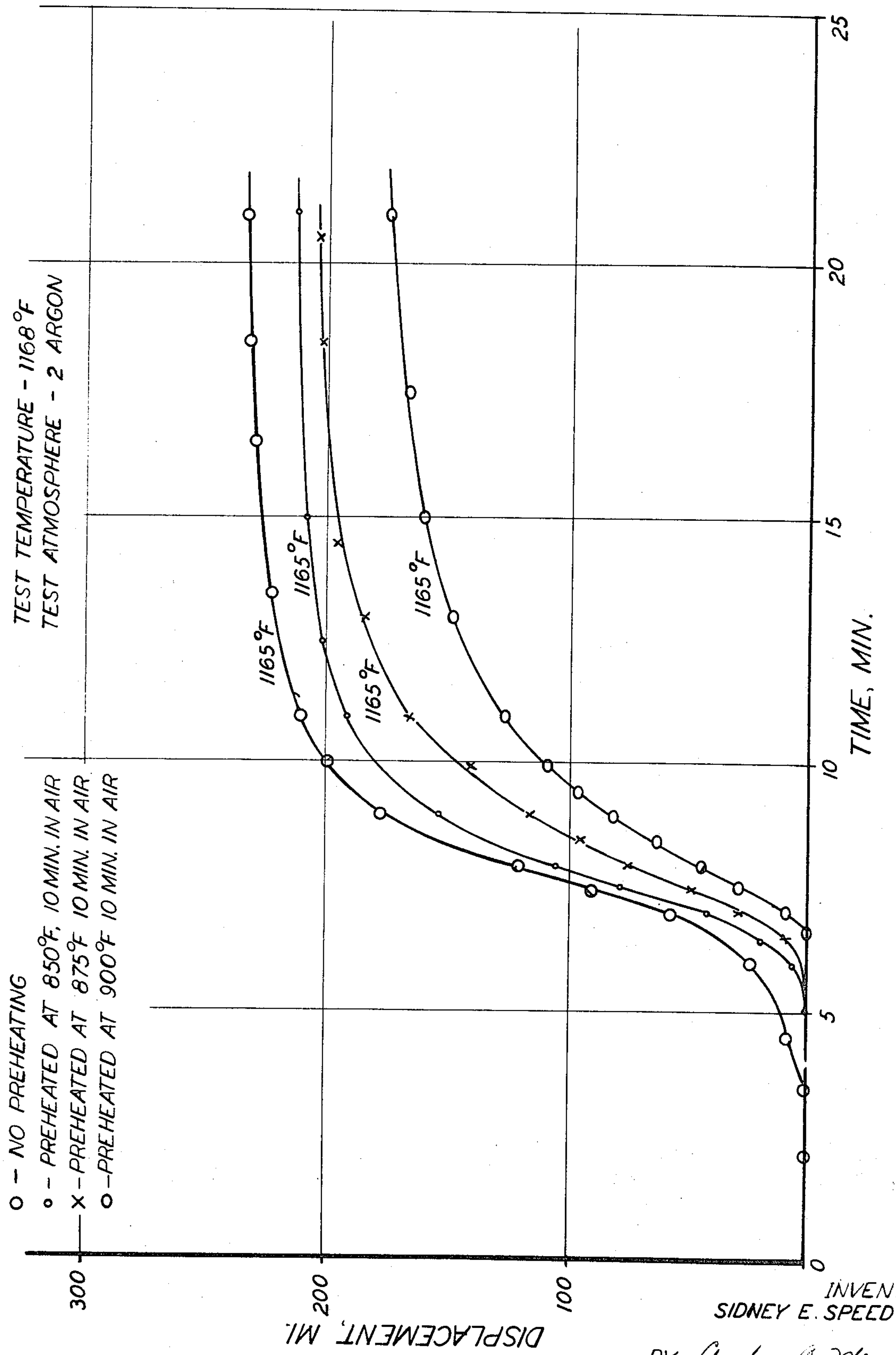

United States Patent Office 3,676,071
Patented July 11, 1972

1

3,676,071
PROCESS FOR CONTROLLED PRODUCTION OF HYDROGEN GAS BY THE CATALYZED AND CONTROLLED DECOMPOSITION OF ZIRCONIUM HYDRIDE AND TITANIUM HYDRIDE

Sidney E. Speed, Stonington, Conn., assignor to Olin Corporation, New Haven, Conn.

Continuation-in-part of application Ser. No. 866,776, Oct. 15, 1969. This application Apr. 22, 1970, Ser. No. 30,886
Int. Cl. C01b *1/02;* C01g *25/02*
U.S. Cl. 23—212 R 13 Claims

ABSTRACT OF THE DISCLOSURE

A process for producing a controlled amount of hydrogen gas by for catalyzing and controlling the solid state decomposition of a material which releases a gas at elevated temperatures comprising mixing and compacting a discrete particulate material containing a major proportion of aluminum with zirconium hydride or titanium hydride. heating the resultant compact at a temperature of 850° to 900° F. for at least five minutes and then heating said compact at a temperature greater than the decomposition temperature of said decomposable material.

This application is a continuation-in-part of co-pending application Ser. No. 866,776, filed Oct. 15, 1969, now abandoned, which is in turn a continuation of Ser. No. 593,969, filed Nov. 14, 1966, now abandoned.

The present invention relates to the solid state decomposition of a material which releases a substantial amount of gas at elevated temperatures.

In particular, the present invention relates to the solid state decomposition of such material as zirconium hydride and titanium hydride.

It is known that numerous materials decompose in the solid state to release a substantial amount of gas at elevated temperatures. These materials and in particular zirconium hydride and titanium hydride have been used widely experimentally in order to develop some practical use for this decomposition reaction.

The principal disadvantages of these materials, however, are that normally complete decomposition reaction occurs at temperatures too elevated to find practical and convenient application.

It is therefore highly advantageous to develop some method for catalyzing and controlling the onset of the solid state decomposition of these materials in order to increase the range of practical applications for the gas evolution reaction.

For example, some typical uses which would benefit by a catalyzed gas evolution are the following: rocket propulsion, atmosphere generation for a variety of uses, to provide a stable source of hydrogen or which is safe and easy to handle and in the preparation of foamed metal.

Accordingly, it is a principal object of the present invention to provide a means for catalyzing and controlling the onset of the solid state decomposition of materials such as zirconium hydride and titanium hydride.

It is a further object of the present invention to provide a process as above which is inexpensive and convenient to employ.

Further objects of the present invention will appear hereinafter.

It has now been found that in accordance with the present invention the foregoing objects may be readily obtained and a convenient and inexpensive process provided for catalyzing and controlling the onset of the solid state decomposition of a material which releases a substantial amount of gas at elevated temperatures.

2

The process of the present invention comprises intimately admixing and compacting a discrete particulate material which decomposes at elevated temperatures to release a substantial amount of gas selected from the group consisting of zirconium hydride and titanium hydride, and a discrete particulate material containing a major proportion of aluminum in an amount of at least 0.8 part by weight based on the amount of aluminum per part of decomposable material, and heating said admixture in an oxidizing atmosphere at a temperature of from 850 to 900° F. for about five to about 45 minutes and preferably for about 5 to about 20 minutes. The compacted admixture is then heated at a temperature of at least the decomposition temperature of said decomposable material, and preferably at a temperature less than 1200° F. It is particularly surprising that this preferred temperature range may be effectively utilized in view of the fact that normally complete decomposition occurs at temperatures too elevated to find practical and convenient application.

It has been found that when the foregoing process is performed, substantial and in fact surprising catalysis and control of the decomposition reaction is obtained. This will be more readily apparent from the appended examples and the drawing which form a part of the present specification.

As can be seen from the examples and drawing this difference is marked, in fact quite surprising and renders the decomposable reaction susceptible to a broader scope of possible applications.

In accordance with the present invention, it is critical that discrete particles of the decomposable material are intimately admixed with discrete particles of a material containing a major proportion of aluminum. The particular particle sizes of both the decomposable material and the aluminum containing material are not necessarily critical; however, the particle sizes should be less than 190 microns. Naturally, the smaller the particle sizes the more intimate the admixture will be and the more surface area of the respective particles will be contacted.

The particular aluminum containing material is not necessarily critical except that the aluminum or the aluminum alloy which is used should contain a major proportion of aluminum. Aluminum or aluminum alloys containing 90% aluminum or more are preferred and in fact high purity aluminum is particularly preferred. The aluminum containing material may contain associated therewith in whole or in part aluminum oxide.

In addition to the above alloys which may be employed include: aluminum-magnesium alloys, aluminum-silicon alloys, aluminum-copper alloys, aluminum-zinc alloys, aluminum magnesium zinc alloys, etc.

The decomposable material may be any of those listed above, namely zirconium hydride, and titanium hydride.

The proportion of decomposable material to aluminum containing material is a critical aspect of the present invention. It is necessary that the aluminum containing material be utilized in an amount of 0.8 part by weight based on the amount of aluminum per part of decomposable material. The particular proportions may vary depending upon the particular decomposable material utilized, but in no case will there be utilized less than 0.8 part by weight of aluminum containing material. For example, when titanium hydride is used at least 1.5 parts by weight of aluminum containing material is used based on the amount of aluminum per part of decomposable material. Naturally, an excess of aluminum containing material may be employed; however, it is not necessary and not preferred to use too great an excess of aluminum containing material per part of decomposable material.

The initial pretreatment comprises dehydridizing the surface layer of the decomposable material by heating the admixture in an oxidizing atmosphere at a temperature of 850° to 900° F. to form zirconium or titanium metal and hydrogen gas. The material is then rapidly oxidized to form a surface oxide layer. Thus, a displacement reaction occurs in the oxidizing atmosphere and may be represented by the following equation, as for example, for zirconium hydride.

$$ZrH_2+O_2 \rightarrow H_2+ZrO_2$$

In general from between 5 to 45 minutes are required for the above reaction to go to completion.

The size and configuration of the compact formed of the admixture is not critical so long as the decomposable material in the center portion of the compact is substantially oxidized in addition to the decomposable material closer to and at the surface of the compact.

If desired the compacting and pretreating steps may be combined where convenient, i.e., the admixture may be hot compacted with the temperature and time limitations of the pretreating step.

The above described pretreatment provides for the formation of an oxide barrier layer which slows the decomposition rate of the metal hydride. In particular the physical barrier serves first to delay the onset of decomposition and then acts as a modulator of the reaction once it commences. The modulating effect occurs since the oxide surface limits the diffusion of hydrogen formed within the particle after decomposition begins which in turn limits, or controls, further decomposition as a function of the hydrogen partial pressure as expressed by the following equations:

$$(1) \quad 2ZrH_2 \rightleftharpoons 2ZrH+H_2$$

$$(2) \quad 2ZrH \rightleftharpoons 2Zr+H_2$$

The discussed pretreatment step provides for increased control in the production processes for forming of aluminum and other metals by making possible greater latitude and flexibility in the timing of such processes. This is so since maximum and predictable volumes of hydrogen gas may be provided at a prespecified temperature and over a predetermined time span.

If desired, the intimate compacted admixture may be stored in this condition for any desired length of time until such time as one desires to utilize them for practical application.

The intimately admixed and compacted particulate materials are then subjected to the heating step of the present invention.

The admixture is heated at an elevated temperature below the normal decomposition temperature of the decomposable material, i.e., neat zirconium hydride and titanium hydride, to preferably below 1200° F. and preferably from 570° to 1200° F. Normally, in excess of 1200° F. the decomposable reaction is too rapid and the temperatures are too excessive for many applications.

As an alternative embodiment of the present invention the intimate admixture may be pretreated before compacting, if desired. Thus, the intimate admixture is first pretreated by heating in an oxidizing atmosphere at a temperature of 850° to 900° F. to form titanium or zirconium metal and hydrogen gas; the aforementioned metal then being rapidly oxidized to form a surface oxide layer. The admixture is then compacted in any suitable manner as in the preferred embodiment.

A method of compacting which is suitable to this embodiment comprises vibrating of the pretreated admixture into a suitable aluminum, or aluminum alloy, tube or other suitable vessel. The filled tube is then subjected to the aforementioned heating step of the present invention.

When the admixture is subjected to the heating step by addition to a bath of molten aluminum or its alloys thermal decomposition without a catalytic reaction first occurs which causes subfracture of the pretreated hydride particles. Surface area of increasing size are thus exposed of the hydride to the molten aluminum and catalytic decomposition then commences.

In accordance with the present invention it has been found that foaming of the aluminum melt is significantly delayed after the pretreatment and addition of the admixture to molten aluminum, as contrasted with about 20 seconds without the pretreatment step. Naturally the exact amount of delay is dependent upon the pretreating temperature and time at any specified temperature.

It has also been surprisingly found that loss of the hydrogen potential during the pretreatment step is minimal and generally does not exceed about 22%, depending upon the time and temperature of the pretreatment. For example, it has been found that the aforementioned loss was only about 1% at 850° F. for 10 minutes, which is a sufficient amount of time at this temperature for effective pretreatment.

Thus, the present invention provides for a catalytic decomposition of zirconium and titanium hydrides at a temperature range which is practical and convenient in foaming of aluminum and its alloys, as well as providing for a controlled and predeterminable rate of decomposition of the hydrides.

The present invention will be more readily apparent from the following illustrative examples.

EXAMPLE I

This example shows the catalytic decomposition of $ZrH_2$ without preheating the compact before adding the compacted mixture to an aluminum melt.

A blend of 8 weight percent $5\mu$ $ZrH_2$ and 92 weight percent $150\mu$ Al-10% magnesium alloy was compacted at a pressure of 31 t.s.i. The compacted admixture was added to 1000 grams of Al-10% magnesium alloy in an amount of about 0.28 weight percent $ZrH_2$, at a melt temperature of 1165° F., with violent breaking up and mixing into the melt. Rapid foaming of the melt occurred in about 20 seconds after introducing the admixture into the melt.

EXAMPLE II

The compacted admixture of Example I was first pretreated, in accordance with the present invention at a temperature of 875° F. for 30 minutes and then compacting at 31 t.s.i. The admixture was then added to 1000 grams of A–218 alloy in an amount of 0.28 weight percent $ZrH_2$ at a melt temperature of 1165° F. exactly as in Example I. Rapid foaming of the melt did not commence for about 190 seconds and the hydrogen potential was not exhausted until about 390 seconds after introducing the admixture into the melt. Thus, in accordance with the present invention, a time delay of about 170 seconds was achieved.

EXAMPLE III

A blend of 8 weight percent $5\mu$ $ZrH_2$ and 92 weight percent $150\mu$ Al-10% magnesium alloy was compacted at 31 t.s.i. and tested in the compacted condition, and in the compacted and pretreated condition at various temperatures for a time period of 10 minutes.

In this example the heating was carried out in a tube type furnace and the gas evolution was measured by the displacement method, with gases collected and measured at approximately 25° C. and at approximately one atmosphere (curves not reduced to S.T.P.).

The results, as shown, in the figure in the drawing, clearly show the effect of varying pretreatments upon the delay of onset of gas evolution and hydrogen potential exhaustion and how these factors may be predetermined.

What is claimed is:

1. A process for producing hydrogen gas by catalyzing and controlling the solid state decomposition of a material which releases a substantial amount of hydrogen gas at elevated temperatures which comprises:

(A) intimately admixing and compacting a discrete particulate material which decomposes at elevated temperatures to release hydrogen gas selected from the group consisting of zirconium hydride and titanium hydride and a discrete particulate material containing a major proportion of aluminum in an amount of at least 0.8 part by weight based on the amount of aluminum per part of decomposable material, (B) heating said compact at a temperature range of 850° to 900° F. for at least 5 minutes in an oxidizing atmosphere to form a surface oxide layer upon said hydride, and (C) heating said compact at a temperature greater than the decomposition temperature of said decomposable material, thereby producing a controlled amount of hydrogen gas.

2. The process of claim 1 wherein said heating of step (C) is less than 1200° F.

3. The process of claim 2 wherein said heating of step (C) is from 570° to 1200° F.

4. The process of claim 2 wherein said decomposable material is zirconium hydride.

5. The process of claim 2 wherein said decomposable material is titanium hydride.

6. The process of claim 3 wherein said heating of step (B) is from 5 to 20 minutes.

7. A process according to claim 3 wherein said material containing a major proportion of aluminum is commercially pure aluminum.

8. A process for producing hydrogen gas by catalyzing and controlling the solid state decomposition of a material which releases a substantial amount of hydrogen gas at elevated temperatures which comprises:

(A) intimately admixing a discrete particulate material which decomposes at elevated temperatures to release hydrogen gas selected from the group consisting of zirconium hydride and titanium hydride and a discrete particulate material containing a major proportion of aluminum in an amount of at least 0.8 part by wegiht based on the amount of aluminum per part of decomposable material, (B) heating at a temperature range of 850 to 900° F. for at least 5 minutes in an oxidizing atmosphere to form a surface oxide layer upon said hydride.

(C) compacting said discrete particulate materials, and (D) heating said compact at a temperature greater than the decomposition temperature of said decomposable material, thereby producing a controlled amount of hydrogen gas.

9. The process of claim 8 wherein said heating of step (D) is from 570° to 1200° F.

10. The process of claim 8 wherein said decomposable material is zirconium hydride.

11. The process of claim 8 wherein said decomposable material is titanium hydride.

12. The process of claim 9 wherein said heating of step (B) is from 5 to 20 minutes.

13. A process according to claim 9 wherein said material containing a major proportion of aluminum is commercially pure aluminum.

References Cited

UNITED STATES PATENTS 3,087,807 4/1963 Allen et al. ---------- 75—20

OTHER REFERENCES

"Chemistry of the Hydrides" by Dallas T. Hurd, 1952 ed., p. 184, John Wiley & Sons, Inc., New York.

"Encyclopedia of Chemical Reactions" by C. A. Jacobson, vol. 8, 1959, ed., p. 252, Reinhold Pub. Corp., New York.

EDWARD STERN, Primary Examiner

U.S. Cl. X.R.

23—140, 210; 75—20 F; 252—182, 188